United States Patent Office 2,752,371
Patented June 26, 1956

2,752,371

PREPARATION OF 3β-PREGNANOL-11,20-DIONE

Gunther S. Fonken and Robert H. Levin, Kalamazoo, Mich., assignors to The Upjohn Company, Kalamazoo, Mich., a corporation of Michigan No Drawing. Application November 17, 1951,
Serial No. 256,961

5 Claims. (Cl. 260—397.45)

The present invention relates to the selective hydrogenation of pregnane-3,11,20-trione and is more particularly concerned with a novel process for the selective hydrogenation of pregnane-3,11,20-trione in the presence of a Raney nickel catalyst.

The novel process of the present invention is concerned with the conversion of a 3-keto group in pregnane-3,11,20-trione to a 3β-hydroxy group, wherein the starting pregnane-3,11,20-trione may be represented by the following structural formula:

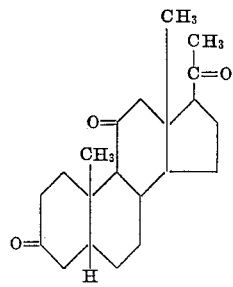

The novel process consists in hydrogenating the starting pregnane-3,11,20-trione, in an organic solvent which is non-reactive under the conditions of reaction, with hydrogen in the presence of a Raney nickel catalyst, to produce 3β-hydroxypregnane-11,20-dione as the reaction product.

An object of the present invention is to provide a method for the selective hydrogenation of the 3-keto group to a 3-hydroxy group of the beta-stereochemical configuration in a starting pregnane-3,11,20-trione. An additional object of the present invention is the provision of a process for the production of a 3β-hydroxy substituent without concomitantly hydrogenating other reactive substituents, namely, the 11-keto and 20-keto groups, in the starting pregnane-3,11,20-trione. Another object of the present invention is to provide a novel process for the selective hydrogenation of the 3-keto group to a 3β-hydroxy group in pregnane-3,11,20-trione, wherein the hydrogenation is carried out in the presence of a Raney nickel catalyst. Additional objects of the present invention will be apparent to those skilled in the art to which this invention pertains.

Previous methods involving hydrogenation of 3-keto steroids in the presence of other catalysts or by chemical means result in the formation of products in which all keto groups have been hydrogenated or in mixtures arising from non-specific hydrogenation. If the hydrogenation procedure is specific for the 3-keto group, methods previously used have resulted in the formation of the 3-alpha-steriochemical configuration or in a mixture of the alpha- and beta-configurations. In striking contrast to these results, when the hydrogenation of pregnane-3,11,20-trione is carried out with hydrogen in the presence of a Raney nickel catalyst, yields of over 95 per cent of the 3β-hydroxypregnane-11,20-dione are consistently achieved.

The process of the present invention is useful in the preparation of steroid compounds having an oxygen atom attached to carbon atom eleven. Such compounds are of particular interest in the field of oxygenated steriods and derivatives thereof, which steroids are known to have biological effects differing markedly from the unoxygenated steroids. The importance of such investigation is moreover emphasized by the acute shortage of adrenal cortical hormones, and by the absence of any present suggestion for alleviation of such shortage except through organic synthesis.

The pregnane-3,11,20-trione utilized as the starting material in the novel process of the present invention is a compound known in the prior art and can be prepared according to the procedure set forth by Reichstein and Fuchs, Helv. Chim. Acta, 26, 721 (1943).

In carrying out the process of the present invention, the pregnane-3,11,20-trione is generally admixed with the hydrogenation catalyst and an organic solvent which is non-reactive under the conditions of reaction, solvents such as methanol, ethanol, isopropanol, dioxane, tetrahydrofuran, isopropyl ether, mixtures of the same, and the like, being satisfactory. The prefered solvent is absolute methanol.

The hydrogenation catalyst employed in the process of the present invention is Raney nickel. The amount of Raney nickel employed may be varied over a wide range, amounts from about traces to large excesses over the amount of steroid used as starting material being effective to catalyze the reaction. From the standpoint of convenience, the use of smaller quantities, from about 0.01 to 50 per cent of the catalyst calculated on the weight of starting steroid, is preferred. The operative ranges of the amount of catalyst are well known in the art for the treatment of other organic compounds and are also suitable for the method of the present invention.

The hydrogenation, as previously stated, is conducted with a Raney nickel catalyst and hydrogen, a pressure of hydrogen between about zero and about ninety pounds per square inch, usually being employed, and ten to fifteen pounds per square inch pressure being preferred. At normal atmospheric pressure, the process of the present invention is operative, but the length of time required to effect substantially complete hydrogenation of the 3-keto substituent is somewhat greater than that required at pressures between about ten and fifteen pounds per square inch, for example. The hydrogenation with hydrogen is preferably continued until about one molar equivalent of hydrogen has been absorbed. Absorption of less than one molar equivalent of hydrogen results in the incomplete conversion of the 3-keto substituent to the 3β-hydroxy substituent while absorption of amounts of hydrogen substantially in excess of one molar equivalent tend to cause hydrogenation in the other reducible positions of the pregnane-3,11,20-trione molecule, namely, the 11-keto and 20-keto groups. While for some purposes this is not undesirable, the preferred embodiment of the invention resides in reduction of the 3-keto group only. Temperatures between about zero degrees centigrade, and the boiling point of the reaction mixture are operative, with room temperature being preferred. The length of time required to complete the reaction is dependent in part upon the pressure at which the hydrogenation reaction is conducted, the temperature employed and the amount of Raney nickel catalyst utilized. In general, the period of reaction is functionally related to the pressure and temperature employed and the hydrogenation is usually continued until the preferred one molar equivalent of hydrogen has been absorbed.

The reaction product, 3β-hydroxypregnane-11,20-dione, is separated from the reaction mixture by conventional procedure, for example, by removing catalyst by filtration, washing the filter cake with a solvent or a mixture of solvents, such as those enumerated above as being suitable for use as reaction media, preferably methanol, and evaporating the solution to yield the desired 3β-hydroxypregnane-11,20-dione as an oily residue from which the pure compound is obtained by crystallization from an organic solvent, or a mixture of solvents, such as ethyl acetate, ethyl acetate-hexane hydrocarbon mixtures, acetone-ether mixtures, petroleum ether, isopropyl ether, ethanol and others, for example. A mixture of ethyl acetate and hexane hydrocarbons is the preferred mixture of organic solvents for crystallization. Alternatively, the oily residue containing the 3β-hydroxypregnane-11,20-dione can be purified by chromatographic separation or like procedure, followed by crystallization of the 3β-hydroxypregnane-11,20-dione in conventional manner.

The following examples are illustrative of the novel process of the present invention, but are not to be construed as limiting.

*Example 1.—3β-hydroxypregnane-11,20-dione*

To a solution of 8.6 grams (0.026 mole) of pregnane-3,11,20-trione in 200 milliliters of absolute methanol was added six grams of Raney nickel catalyst, and the resulting mixture was hydrogenated at room temperature under a hydrogen pressure between about ten and fifteen pounds per square inch until one molar equivalent of hydrogen had been absorbed. The catalyst was filtered and the filter cake washed with 200 milliliters of boiling methanol. The filtrates were combined and the methanol evaporated to yield an oily residue which was then dried and crystallized from a mixture of ethyl acetate and hexanes (Skelly Solve B). Seven grams of 3β-hydroxypregnane-11,20-dione was obtained from the first crop of crystals and an additional 1.18 grams was obtained from the second crop. The overall yield was 95 per cent. Repeated crystallization from a mixture of ethyl acetate and hexanes (Skelly Solve B) afforded substantially pure 3β-hydroxypregnane-11,20-dione. The specific rotation was $[\alpha]_D^{24}$ plus 96 degrees (chloroform).

Analysis:
Per cent calculated for $C_{21}H_{32}O_3$___ C, 75.86; H, 9.70
Found _____ C, 75.19; H, 9.43
C, 75.02; H, 9.52

The product was further identified by conversion to its acetate, known in the art (British Patent 594,878, accepted November 12, 1947), by the action of acetic anhydride in pyridine. The 3β-acetoxypregnane-11,20-dione thus formed had a melting point of 164–5 degrees centigrade (uncorrected) and its specific rotation was $[\alpha]_D^{24}$ plus 99 degrees (chloroform).

*Example 2.—3β-hydroxypregnane-11,20-dione*

Following the procedure of Example 1, 0.05 mole of pregnane-3,11,20-trione was hydrogenated in absolute ethanol in the presence of two grams of Raney nickel catalyst at forty degrees centigrade. Hydrogenation was continued until about one molar equivalent of hydrogen had been absorbed. Separation according to the procedure of Example 1 gave substantially pure 3β-hydroxypregnane-11,20-dione upon repeated crystallization from acetone. The specific rotation was $[\alpha]_D^{24}$ plus 99 degrees (chloroform).

*Example 3.—3β-hydroxypregnane-11,20-dione*

Following the procedure of Example 1, 0.04 mole of pregnane-3,11,20-trione was hydrogenated in isopropyl ether with hydrogen in the presence of twelve grams of Raney nickel catalyst at approximately fifty degrees centigrade and at approximately atmospheric pressure until one molar equivalent of hydrogen had been absorbed. Purification of the crude 3β-hydroxypregnane-11,20-dione according to the procedure of Example 1, using petroleum ether as the crystallization medium, produced substantially pure 3β-hydroxypregnane-11,20-dione. The specific rotation was $[\alpha]_D^{24}$ plus 96 degrees (chloroform).

It is to be understood that the invention is not to be limited to the exact details of operation shown and described as obvious modifications and equivalents will be apparent to one skilled in the art, and the invention is therefore to be limited only by the scope of the appended claims.

We claim:

1. A process for the conversion of the 3-keto group in pregnane-3,11,20-trione to a 3-beta-hydroxy group which includes: hydrogenating pregnane-3,11,20-trione, in an organic solvent, with about one molar equivalent of hydrogen in the presence of a Raney nickel catalyst, and separating 3β-hydroxypregnane-11,20-dione.

2. A process for the conversion of the 3-keto group in pregnane-3,11,20-trione to a 3-beta-hydroxy group which includes: hydrogenating pregnane-3,11,20-trione, in an organic solvent, with about one molar equivalent of hydrogen in the presence of a Raney nickel catalyst, and at a temperature between about zero degrees centigrade and the boiling point of the solvent employed, and separating 3β-hydroxypregnane-11,20-dione.

3. A process for the conversion of the 3-keto group in pregnane-3,11,20-trione to a 3-beta-hydroxy group which includes: hydrogenating pregnane-3,11,20-trione in methanol with about one molar equivalent of hydrogen in the presence of a Raney nickel catalyst at a pressure between about zero and ninety pounds per square inch, and separating 3β-hydroxypregnane-11,20-dione.

4. A process for the conversion of the 3-keto group in pregnane-3,11,20-trione to a 3-beta-hydroxy group which includes: hydrogenating pregnane-3,11,20-trione in methanol with about one molar equivalent of hydrogen in the presence of a Raney nickel catalyst at a pressure between about ten and fifteen pounds per square inch, and separating 3β-hydroxypregnane-11,20-dione.

5. A process for the conversion of the 3-keto group in pregnane-3,11,20-trione to a 3-beta-hydroxy group which includes: hydrogenating pregnane-3,11,20-trione in methanol with about one molar equivalent of hydrogen in the presence of a Raney nickel catalyst at a pressure between about ten and fifteen pounds per square inch, and at about room temperature, and separating 3β-hydroxypregnane-11,20-dione.

References Cited in the file of this patent

UNITED STATES PATENTS 2,168,685    Ruzicka _____ Aug. 8, 1939

OTHER REFERENCES

Euw: Helv. Chim. Acta., 27, 831–32 (1944).

Fieser et al.: Natural Products Related to Phenanthrene, 3d ed., page 363 (1949).